(12) United States Patent
Lanigan, Sr. et al.

(10) Patent No.: US 8,892,243 B1
(45) Date of Patent: Nov. 18, 2014

(54) UNIVERSAL SYSTEM AND METHOD OF HANDLING A CONTAINER

(76) Inventors: John J. Lanigan, Sr., Orland Park, IL (US); Myron Glickman, Arlington Heights, IL (US); Ralph R. Swanson, Lockport, IL (US); Richard J. Marec, Romeoville, IL (US)

( * ) Notice: Subject to any disclaimer, the term of this patent is extended or adjusted under 35 U.S.C. 154(b) by 201 days.

(21) Appl. No.: 13/552,867

(22) Filed: Jul. 19, 2012

Related U.S. Application Data

(60) Provisional application No. 61/511,306, filed on Jul. 25, 2011.

(51) Int. Cl.
*G06F 7/00* (2006.01)

(52) U.S. Cl.
USPC .............. 700/218; 104/96; 104/29; 382/104; 705/9

(58) Field of Classification Search
USPC ......................................................... 700/218
See application file for complete search history.

(56) References Cited

U.S. PATENT DOCUMENTS

| | | | |
|---|---|---|---|
| 2004/0125985 A1* | 7/2004 | Heidenback et al. | 382/104 |
| 2007/0288294 A1* | 12/2007 | Olsen et al. | 705/9 |
| 2008/0011182 A1* | 1/2008 | Di Rosa et al. | 104/96 |
| 2009/0095189 A1* | 4/2009 | Roop | 104/29 |

* cited by examiner

*Primary Examiner* — Gene Crawford
*Assistant Examiner* — Kyle Logan

(57) ABSTRACT

A universal system and method for handling a container is disclosed. The system can include: a support structure (10) defining a bay (32), the support structure (10) including support shoes configured to support a container; a sensor (58) for determining a length of a container in the bay; and a controller (60) configured to operate the support structure (10) including a storage mode and a retrieval mode.

19 Claims, 8 Drawing Sheets

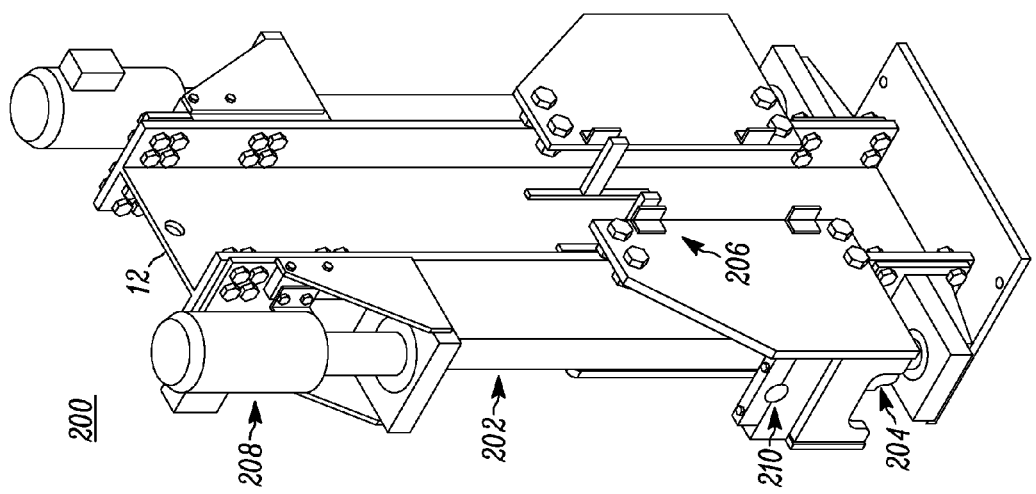
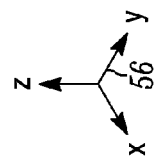
FIG. 2

UNIVERSAL SYSTEM AND METHOD OF HANDLING A CONTAINER

FIELD OF THE INVENTION

This invention relates to the transportation and logistics industry, and more particularly to a universal system and method of handling a container.

BACKGROUND OF THE INVENTION

In the intermodal transportation industry shipping containers are loaded and off loaded onto and off of trains at intermodal facilities. Often the containers are transferred directly to or from container chassis. Therefore a large container facility will have a large number of container chassis available. In addition, a shipper or end consignee may enter the facility with his own tractor and chassis. The nature of the operation requires the transfer of containers from one chassis to another. This transfer operation is called a flip in the industry. Currently flips are accomplished using the general facility mobile lifting equipment, such as cranes or side loaders. It would be considered an improvement in the industry, if new systems can accomplish a flip operation without the use of mobile lifting equipment, and can universally handle 20, 40, 45, 48 and 53 ft. shipping containers. There is a need to be able to efficiently handle, accommodate, temporarily store and retrieve containers of various dimensions.

There is a need for enhanced methods of handling containers at terminals, hubs, warehouses and the like.

Thus, there is a need for the development of new technologies to improve the efficiency of container and chassis transfer operations.

BRIEF DESCRIPTION OF THE DRAWINGS

FIG. 2 is a partial side perspective view of an embodiment of a universal system and method of handling a container shown in FIG. 1, showing a column with a lifting mechanism, in accordance with the instant invention.

FIG. 7 is an exemplary flow diagram of an embodiment of a universal method of handling a container, specifically retrieving a stored container, in accordance with the instant invention.

DESCRIPTION OF A PREFERRED EMBODIMENT

Detailed below is a universal support structure and method that can accomplish a flip operation in one embodiment, without the use of mobile lifting equipment, and can universally handle 20, 40, 45, 48 and 53 ft. shipping containers. In another embodiment, the support structure can be loaded or unloaded from an upper portion or top, via a crane.

The terms support structure, system, and universal support structure and method are generally used interchangeably herein.

Figure 1:
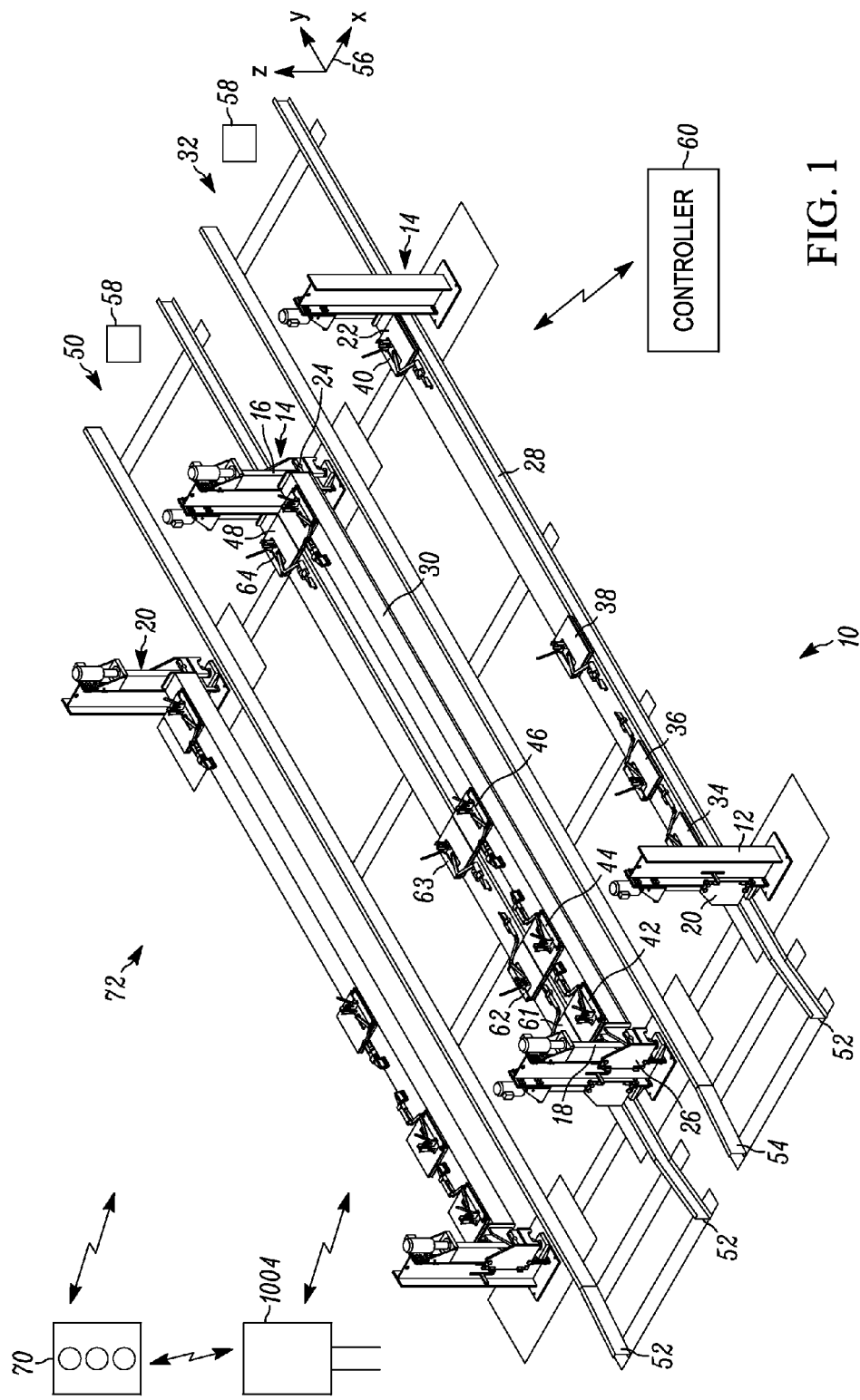
FIG. 1 is a side perspective view of an embodiment of a universal system and method of handling a container, in accordance with the instant invention.

FIG. 1 shows the support structure 10. The support structure 10 shows four columns 12, 14, 16 and 18, each of which has a lifting mechanism 20, 22, 24 and 26. On each side of a first bay 32, the lifting devices on the columns are attached to longitudinal beams 28 and 30. The longitudinal beams 28 and 30 include a number of sliding support shoes 34, 36, 38 and 40 and 42, 44, 46 and 48, respectively. In a preferred embodiment, the support shoes are made of a material that minimizes scratching to a bottom of a container and is generally rectangular or square. Preferably, the support shoes have a surface along the X-axis of about one foot, for enhanced support and docking.

The support shoes are positioned along the beams 28 and 30 so that the proper combination of support shoes can be actuated to support and lift various lengths of containers. In one embodiment, the range of container lengths that can be handled is about 20 ft. to 53 ft. as described herein, but is not limited to those lengths. Additional container lengths can be accommodated, by adjusting the length of the beam and the number and positions of the support shoes, as should be understood by those skilled in the art. In one embodiment, a column can have lifting mechanisms on one or both sides of the column.

In one embodiment, each lifting or longitudinal beam has four pairs of sliding shoes including first pair, second pair, third pair and fourth pair, numbered 61, 62, 63, and 64, for each bay in FIG. 1. The first and third pairs 61 and 63 are used for a 20 ft container, and the second and fourth pairs 62 and 64, are used for container lengths 40 ft. through 53 ft., in one embodiment.

A second bay is shown with similar structure, as described with respect to the first bay 32. Thus a plurality of adjacent bays may be provided, as desired. In the embodiment in FIG. 1, two bays are shown. The operation of the first and second bays 32 and 50 can be independent of each other. Chassis tire guides 52 and 54 are provided, to enhance Y-axis alignment, as shown in compass 56.

FIG. 1 also shows a sensor 58, controller 60 and indicator 70, in block form, as detailed below. These components, as well as the other electrical and mechanical components are coupled to operate the support structure 10, as detailed herein. The locations of such components can vary, as should be understood by those skilled in the art. Also, as should be understood, all of the sensors described herein can vary widely, and in a preferred embodiment include imagers strategically located to monitor the activities relating in proximity to the support structure, as detailed herein.

Figure 3:
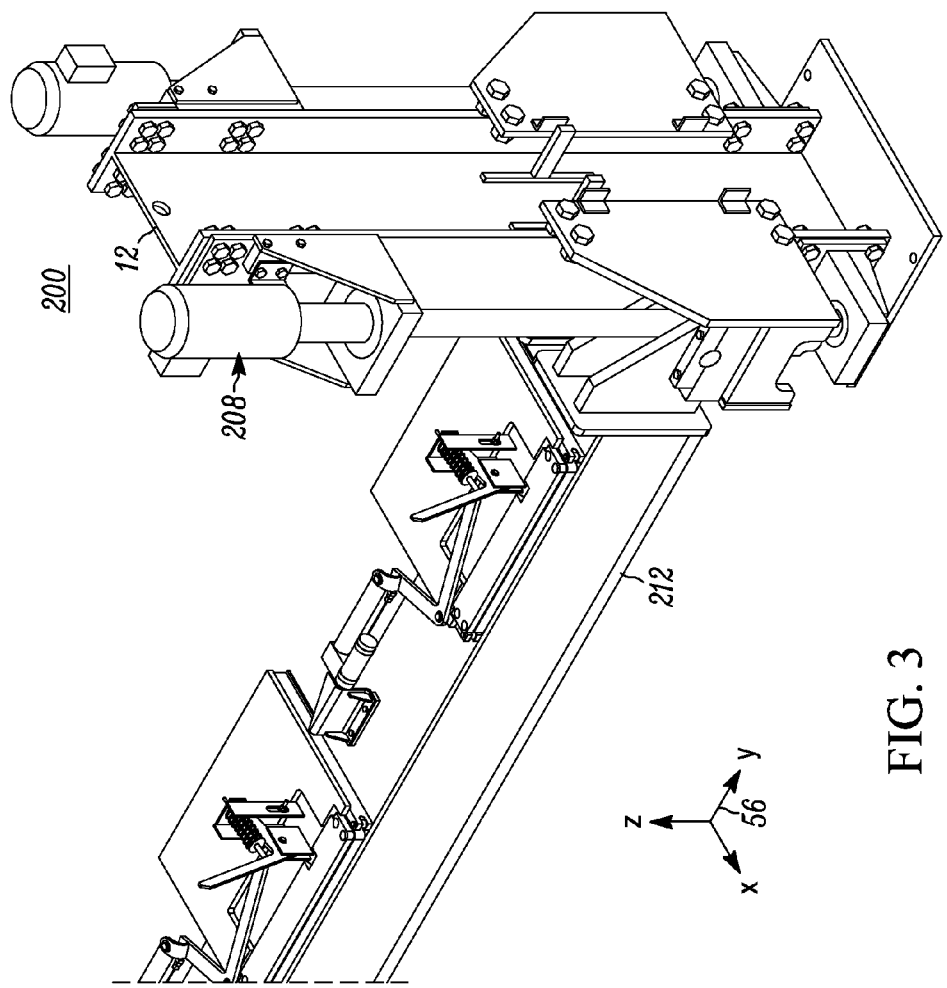
FIG. 3 is a partial side perspective view of an embodiment of a universal system and method of handling a container shown in FIG. 2, showing a column with a lifting mechanism and beam, in accordance with the instant invention.

FIGS. 2 and 3 show an exemplary lifting mechanism 200, which in this figure, includes an Acme screw 202 and nut 204 mechanism. The nut 204 is attached to the lifting carriage 206 and the screw 202 is rotated be an electric motor and gearbox 208. The screw 202 may also be rotated by any suitable means, such as hydraulic, pneumatic motors and the like, as should be understood by those in the art. Other types of lifting mechanisms can include, hydraulic or electric linear actuators, wire rope winches driven by hydraulic or electric power, etc. as should be understood by those skilled in the art. An attachment point 210 for the beam 212 is also shown.

Figure 4:
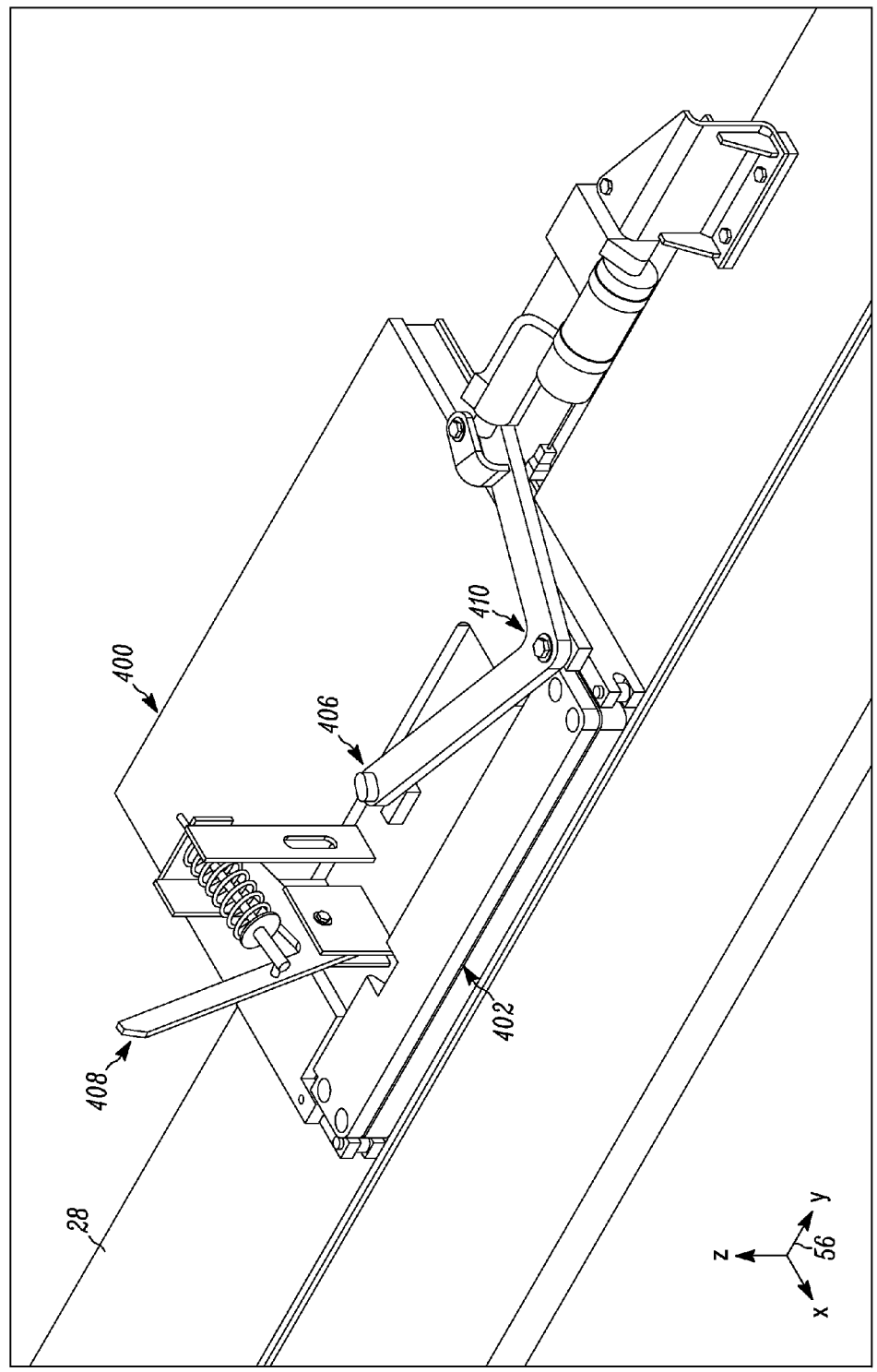
FIG. 4 is a partial enlarged perspective view of an embodiment of a universal system and method of handling a container shown in FIG. 3, showing a beam and support shoe, in accordance with the instant invention.

As shown in FIGS. 2-3, the lifting mechanism 200 is constructed to lift heavy loads while being narrow in profile, to take up a minimal amount of space in an X-axis direction, for enhanced clustering of adjacent support structures and bays 32 and 50, in FIG. 1. In a preferred arrangement, the motor and gear box 208 and lifting carriage 206 are aligned in a Z-axis and extend minimally along an X-axis, to provide a support structure with a minimal X-axis dimension, for space savings along the X-axis, as shown in FIG. 1. This construction can allow a narrow construction, for placement of a plurality of adjacent support structures, for enhanced clustering, efficient foot printing and close placement of adjacent bays, as desired. The arrangements of the lifting mechanism 200 shown in FIGS. 2 and 3, is exemplary. Other arrangements for mounting the lifting mechanism 200 onto the vertical columns may be employed, without departing from the spirit and scope on the invention. FIG. 4 shows an embodiment of a support shoe 400 on a longitudinal beam 28. In operation, when a container on a chassis enters a bay, for example, by means of a typical tractor backing into the bay and the chassis stops at the proper position, the appropriate shoes for the container length slide under the container. When all of the appropriate shoes are under the container, all the lifting mechanisms simultaneously operate and lift the container from the chassis. The chassis is positioned laterally by the tire guides that keep the chassis centered in the bay. A lifting pad 402, such as a nonmetallic or soft pad, can be provided, to minimize undesirable damage or distortion of the bottom side rails or cross members of the container when it is lifted and supported by the shoes. In the embodiment shown, the support shoe 400 is driven by an electric linear actuator 404 and a crank linkage 406. A pivot pin is shown at 410. As should be understood, the linear sliding motion can be achieved with various suitable devices, such as a hydraulic cylinder in place of the electric linear actuator, a direct acting hydraulic cylinder or electric actuator, or a rack and pinion driven by electric or hydraulic means.

In the embodiment shown in FIG. 4, there is a container side sensing device 408 shown for sensing the side of the container. As understood, in one embodiment, proximity sensors and the like can be used. The sensing device 408 indicates that the support shoe 400 is in the proper position, so that the lift pad is properly positioned to contact the bottom side rails and cross members of the container. This sensing device 408 accommodates different container widths, some typical widths are 96 inches and 102 inches. However, a wider lifting pad 402 may be provided so that proper contact with the bottom of various width containers can be achieved at full extension of the support shoe 400, without the use of the container sensor device 408, in one embodiment, as should be understood. This sensing device 408, is coupled to the electronics, as detailed herein.

Figure 5:
FIG. 5 is an exemplary flow diagram of an embodiment of a universal method of handling a container, specifically storing a container, in accordance with the instant invention.

A method of handling a container in shown in block diagram form in FIG. 5. The method 500 includes the steps of: determining 510 a length dimension of a first container in a bay defined by a support structure; actuating 520 certain support shoes to move from a stowed position to an extended position, based on the determined length dimension; activating 530 a support structure to move to an elevated position; and indicating 540 that a handoff of the first container to the support structure has been completed.

Advantageously, an efficient and effective method of temporarily storing different sized containers in a support structure is provided. A hauler with a motorized vehicle and chassis, for example, can easily deliver a container to a structure, independently, without the need for coordinating a handoff with a crane operator.

Also advantageously, in one embodiment, a method 500 can provide a universal lifting or handling arrangement, that is particularly adapted to accommodate various sized containers. For example, the first and third pairs 61 and 63 of support shoes can be used for smaller containers, such as a 20 ft container, and the second and fourth pairs 62 and 64 of support shoes can be used for larger containers, such as a container with a length of 40 ft. through 53 ft., in one embodiment.

The method 500 can further include determining that a container is located at a predetermined parked position, along a Y-axis, before the activating step. See for example FIG. 9. Once at a proper position, the method can proceed. As should be understood, various indicators or prompts for a hauler can be provided, to move forward or backward to the proper or designated parked/stopped position. This also assures for proper alignment of corner castings and twist locks, as detailed hereafter in the retrieval method.

The method 500 can further include verifying that the certain support shoes in the actuating step 520, are in an extended position, along an X-axis, before the activating step 530. Advantageously, verification before further proceeding to a next step, helps to provide an enhanced and repeatable method.

In one embodiment, the activating step 530 includes moving the support structure from a default elevation to an elevated position defining a stored container position. For example, the default elevation for certain small containers on a chassis can be at a different elevation than for a larger container on a compatible chassis. Thus, different default elevations can be accommodated for in the method 500.

The indicating step 540 can include prompting a hauler that it is appropriate to exit the support structure and leave the first container in the elevated position. The prompt can be a green light, audio and monitor and the like.

The method 500 can include locating a plurality of bays each with a support structure, substantially immediately adjacent to each other and arranged in a substantially parallel arrangement, as shown for example, in FIG. 1. This can provide efficient space utilization.

Figure 10:
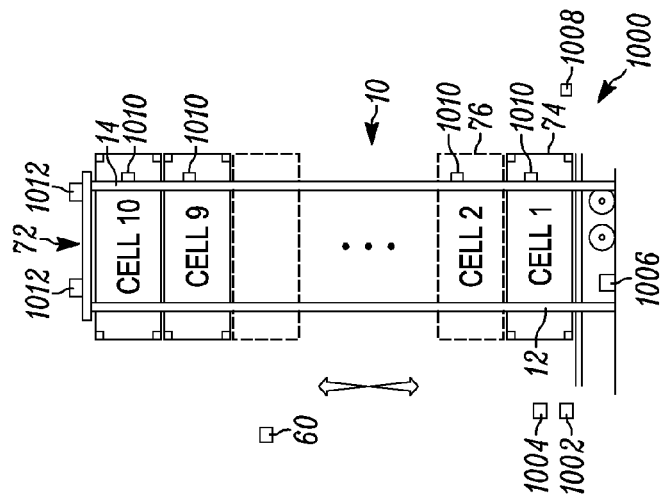
FIG. 10 is a simplified side view of an embodiment of a system and method of handling containers, showing a multi-level support structure, in accordance with the instant invention.

The method 500 can provide a plurality of predetermined elevations for the support structure. For example, along a Z-axis, the support structure can hold a plurality of containers, provided the lifting column is sufficiently long, as shown in FIG. 10.

Figure 6:
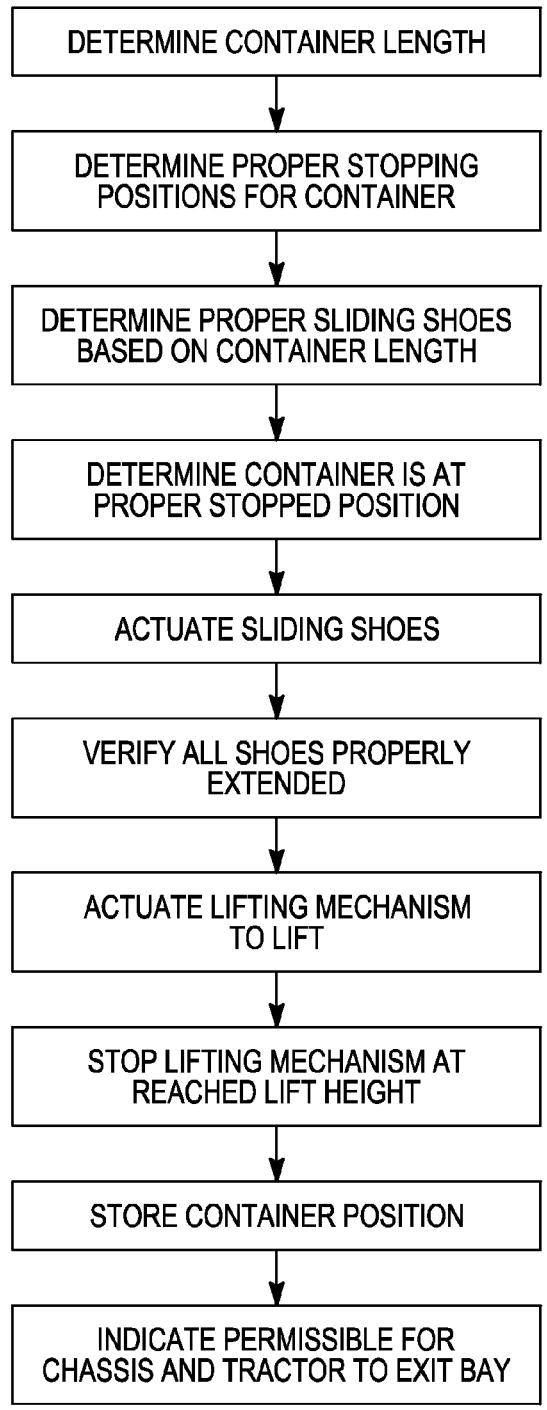
FIG. 6 is an exemplary flow diagram of an embodiment of a universal method of handling a container, in connection with an example of storing a container, in accordance with the instant invention.

An example and exemplary flow diagram for a method of storing a container is shown in FIG. 6. The method 600 includes: determining container length, determining proper stopping position for a container, determining proper sliding shoes to be actuated, based on container length, determining the container is at proper stopped position, actuating the sliding shoes, verifying that the appropriate shoes are properly extended, actuating the lifting mechanism to lift, stopping the lifting mechanism at a predetermined height, maintaining the stored container position and indicating that it is permissible for the chassis and tractor to the exit bay.

In an alternate embodiment, a method 700 of handling a container is shown in FIG. 7. The method 700 can include the steps of: storing 710 a length dimension of a stored container in a stored position of a support structure, in memory; verifying 720 chassis compatibility with the stored container and that the chassis is in a proper position on the Y-axis; activating 730 a support structure to move to a lowered position from the stored position; actuating 740 certain support shoes to move from an extended position to a stowed position, based on the stored length dimension; and indicating 750 that a handoff of the stored container to a chassis has been completed. Advantageously, an efficient and effective method of retrieving a temporarily stored container in a support structure is provided. A hauler, such as, with a motorized vehicle and chassis, can easy retrieve a container from a support structure, independently, and without the need of coordinating a handoff with a crane operator. Advantageously, the method and structure can accommodate various container dimensions, such as with various lengths and widths.

The method 700 can include indicating that it is permissible to enter a bay defined by the support structure, along a Y-axis. Advantageously, indicating a permission can help to prevent a hauler from entering a wrong bay and attempting to retrieve the wrong container. This can be connected to a monitoring capability and/or security facility that an undesirable tampering has occurred.

The method 700 can include indicating a predetermined parked position for an empty chassis, based on the stored length dimension, before the activating step 730. This feature can help to expedite the parking and positioning process along a Y-axis, in the bay.

Likewise, the method 700 can include verifying that an empty chassis is positioned at a predetermined parked position, before the activating step. Advantageously, a proper parked position along a Y-axis in the bay is important, as in the retrieval method, the corner castings of a container and the twist locks of a chassis need to be vertically aligned (along a Z-axis), for a proper handoff to occur.

The activating step 730 can include lowering the support structure from the stored position to the lowered position including a full down position configured for placing the stored container on a chassis. In one use case, the elevation of a full down position can very based on the length dimension of a container, as detailed herein.

The activating step 730 can include lowering the support structure from the stored position to the lowered position including a full down position configured for placing the stored container on a chassis, verifying that the support structure is at the full down position and retracting the certain support shoes to the stowed position. This feature can provide an efficient and repeatable method.

The activating step 730 in one embodiment can include lowering the support structure to a full down position configured for placing the stored container on a chassis and adjacent to what was formerly an empty chassis, verifying that the support structure is at the full down position, retracting the certain support shoes to the stowed position, and verifying that the certain support shoes are in the stowed position. This can contribute to making an efficient and repeatable method.

The indicating step 750 can include prompting a hauler that it is appropriate to exit the support structure with the container that was stored, for enhancing the efficiency and repeatability of the retrieval method.

In a preferred embodiment, the methods herein can include a plurality of bays, such as shown in FIG. 1 as 32 and 50, each with a support structure, substantially immediately adjacent to each other and arranged in a substantially parallel arrangement with each other, can be provided. This can provide enhanced space utilization and improved and efficient method handling methods.

Figure 8:
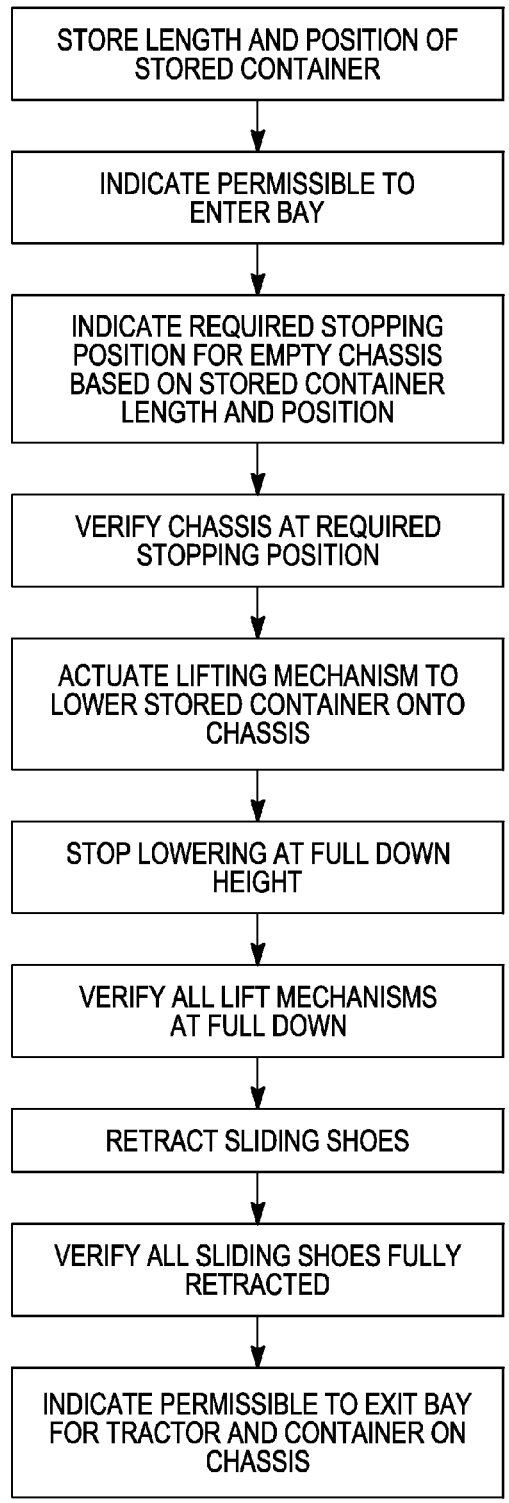
FIG. 8 is an exemplary flow diagram of an embodiment of a universal method of handling a container, in connection with an example of retrieving a stored container, in accordance with the instant invention.

An example of an exemplary method 800 of retrieving a previously stored container is shown in FIG. 8. The sensor and controller can store the length and position of the stored container. When the chassis enters the bay, the distance sensing system indicates when the driver should stop backing in. When the chassis is in the proper position all lifting mechanisms lower the container onto the chassis. The lowering operation continues until the lifting mechanisms are at their fully lowered position. The lifting mechanisms stop at the fully lowered position. When all lifting mechanisms are at the fully lowered position all sliding shoes retract. When all sliding shoes are retracted the driver is given an indication that it is now permissible to leave the bay with the container on the chassis.

A system of distance and position sensors, indicator lights and a command and control computer can be used to determine container length, stopping position for chassis and containers, automatic lifting and lowering operation and driver prompts by means of indicator lights or other devices. The sensors may be lasers, radar, photoelectric or other suitable sensing devices.

Advantageously, the method can provide an efficient method for a flip operation in one use case. The method is particularly adapted for use in connection with ports, distribution hubs, warehouses and the like.

Advantageously, the method and system is free from requiring real time coordination between a system operator and truck driver, thus facilitating the flip process and making the operation more efficient.

In one embodiment, an enhanced and universal system for handling a container is provided. The system can include: a support structure 10 defining a bay 32, the support structure 10 including support shoes configured to support a container; a sensor 58 for determining a length of a container in the bay; and a controller 60 configured to operate the support structure 10 including a storage mode and a retrieval mode, the controller 60 in the storage mode configured to actuate certain support shoes to move from a stowed position to an extended position, based on the sensed length of the container; activate the support structure to move to an elevated position; and indicate that a handoff of the container to the support structure has been completed, and the controller in the retrieval mode configured to store a length dimension of a stored container in a stored position; verify chassis length compatibility with the stored container; activate the support structure to move to a lowered position from the stored position; actuate certain support shoes to move from an extended position to a stowed position, based on the stored length dimension; and indicate that a handoff of the stored container to a chassis has been completed.

Advantageously, an efficient and effective handling system, of temporarily storing or retrieving various dimensioned containers is provided. A hauler, for example, with a motorized vehicle and chassis, can easy deliver or retrieve a container of varying length, independently without the need of coordinating a handoff with a crane operator or ground personnel.

The system can provide a plurality of predetermined elevations for the support structure. For example, along a Z-axis, the support structure can hold a plurality of containers, provided the lifting columns 12 and 14 are elongated, as shown in FIG. 10. In a preferred embodiment, the support structure 10 can be configured to receive or deliver a container at a top 72, such as from or to a crane. Also, the support structure 10 can include at least a first ground cell 74 and a second cell 76. The number of cells can vary to accommodate a desired number of containers. This provides for enhanced versatility.

Figure 9:
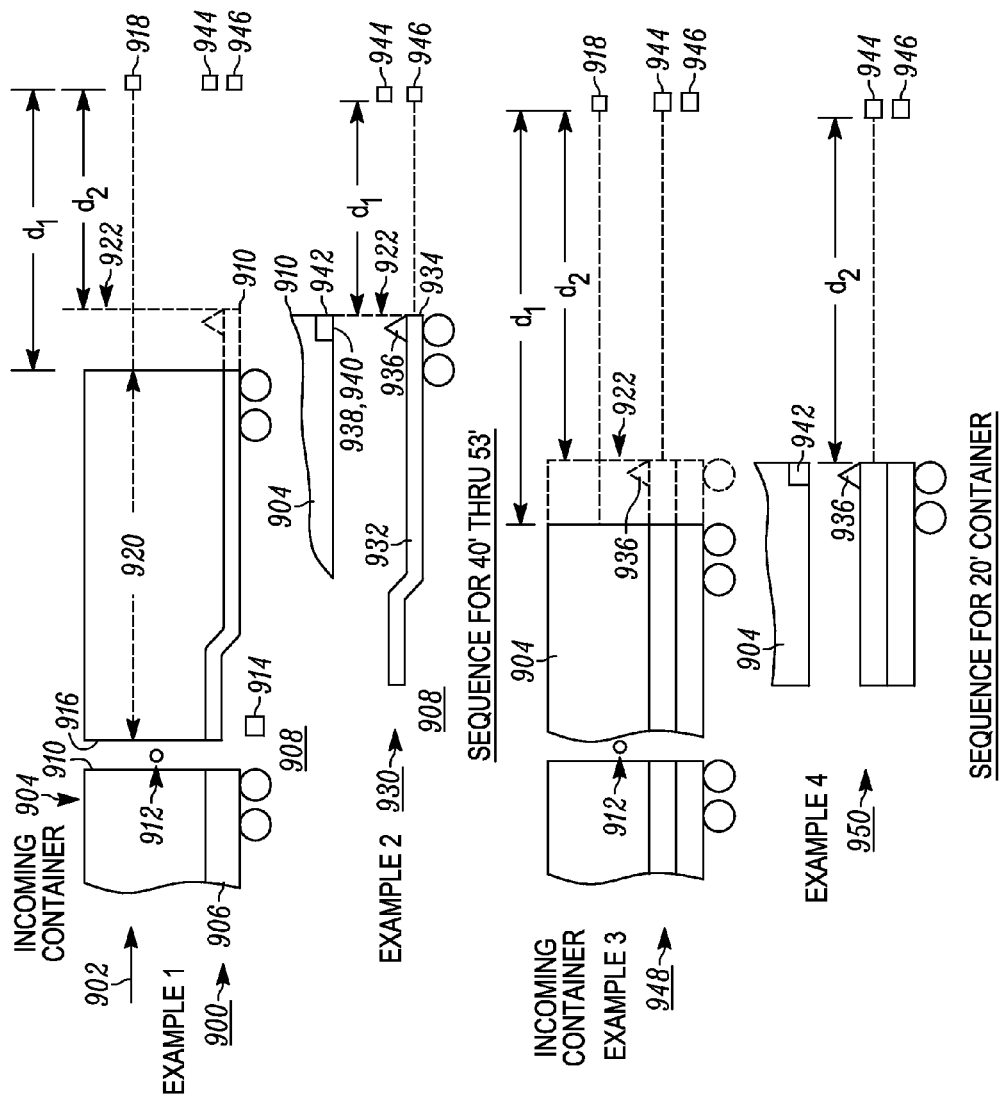
FIG. 9 is an exemplary simplified drawing of a universal method of handling a container, specifically showing an exemplary sensing method, in accordance with the instant invention

FIG. 9 provides examples of the methods and structure previously discussed. At Example 1 item 900, an arrow 902 is shown, and a container 904 on a chassis is backed into a bay 908. A rear edge 910 of the container 904 breaks a through beam 912 and a container distance sensing laser 914 starts measuring distance. Continuing, as a front edge 916 of the container 904 passes the through beam 912, the through beam 912 is reestablished. The distance d1 sensed by a container laser distance sensor 918 determines a length 920 of the container 904 and the proper stopping position 922 and distance d2 for that particular container length 920 is established by a control system or controller 60 (the terms control system and controller are used interchangeably and have similar meanings, herein). When the container 904 reaches d2, a stop indication or prompt is actuated, for the driver, via indicator 70, for example. When the container 904 is stopped at the proper position 922 and distance d2, the appropriate support shoes can be extended from a stowed position to an extended position. Then the container 904 is lifted off the chassis 906 by the lifting longitudinal beams 28 and 30. The container 904 position and container length 920 is stored by the control system.

At Example 2, item 930, an empty chassis 932 enters the bay 908 to retrieve the stored container 904, the proper chassis sensor measures the chassis position and indicates a stop indication to the driver. When the chassis is stopped stop position 922 and at distance d2, the rear 934 of the chassis structure, which has twist locks 936 is lined up with the rear 910 of the container 904. The distance from the rear end 934 of the chassis 932 to the twist lock 936 is generally about the same distance as the distance from the rear edge 910 of the container 904 to a center 938 of a hole 940 in the bottom of the corner casting 942 that accepts the twist lock 936. Thus, during the retrieval process, the rear end 934 of the chassis 932 must be substantially lined up with the rear edge 910 of the container 904, so the twist lock 936 will enter the corner casting(s) 942 on the container 904 when the container 904 is lowered onto the chassis 932. This process is generally the same for 20 ft. and 40 ft. through 53 ft. containers, except that conventional chassis structures that include the twist locks on the 20 ft. chassis, is usually higher off the pavement than conventional chassis for the 40 ft. through 53 ft. containers.

Therefore, in one embodiment, there are two chassis sensors including a small chassis sensor 944 and a large chassis sensor 946, such as sensor 944 for a 20 ft. chassis and a second sensor 946 for 40 ft. through 53 ft. long chassis, as shown in FIG. 9. In one embodiment, the chassis sensors 944 and 946 and container distance sensor 918, are laser distance sensors that produce an analog signal that is proportional to the measured distance. As should be understood, other sensing methods and structure can be used, as should be understood by those skilled in the art.

The sequence for Example 3 item 948 and Example 4 item 950 relate to smaller containers, such as 20 foot long container, and are similar to Example 1, item 900, and Example 2, item 930, detailed previously, except that sensor 944 is used in Examples 3 and 4 and the stop position 922 is different.

FIG. 10 depicts an embodiment of a multi-level support structure 1000. Most if not all of the previous structure previously detailed, can be provided in this embodiment. A top section 72 can be configured to accept a container from above and allow retrieval from a crane from above, for further flexibility of operations. A plurality of cells for receiving containers are shown, including at least a first cell 74 and second cell 76. A plurality of sensors can be provided for enhanced operations. For example, sensor 1002 can provide entrance alignment and identification sensing. A monitor 1004 can assist a driver with alignment in entering the cell 74 and providing notice that a proper hand off has been accomplished. The monitor preferably includes a user interface to receive a pass code, swipe card, or proximity card to allow permission for a driver to operate the support structure 10 or 100, for example. A sensor 1006 can provide enhanced alignment sensing in a cell. A sensor 1008 can provide dimensional information, such as length, for precise parking or stop positioning. A sensor 1010 can provide identification and population information in various cells. And sensor 1012 can provide X, Y and Z location, alignment and dimensional sensing, for example. The sensors can provide additional sensing, as desired, in connection with the operations of the support structure 10 and 1000, as should be understood. The sensors herein can very, they preferably include imagers for visual monitoring, and can include further sensors such as proximity sensing, metal sensing and the like, for enhanced sensing, monitoring and aligning, as desired.

All of the electronics herein can be hard wire connected or be wirelessly connected to a controller 60 or control circuitry, as should be understood. Ground personnel and remote personnel can monitor all activity relating to the support structures 10 and 1000.

Advantageously, an efficient and effective handling system, of temporarily storing or retrieving various dimensioned containers is provided. A hauler and crane operator, for example, can easy deliver or retrieve a container of varying length, to or from the ground or the top, independently without the need of coordinating a handoff with other operating personnel, for example, provided the hauler or crane operator has been granted a permission to interact with such structure 10 or 1000.

Some advantages and potential benefits of various embodiments, are listed below:

1. At least five different conventional lengths of containers can be stored, staged, retrieved or flipped via the support structure.

2. The support structure is particularly adapted to flip various sized chassis for replacement of a chassis, in an automated or robotic fashion.

3. The support structure can temporarily store various sized containers substantially automatically and provide immediate selectivity for retrieval of a stored container.

4. The support structure and method can communicate and monitor in real time the activity relating to container handling and staging, such as entering, placement and/or removal of containers. The communication can be provided to entities with permission, such as to a buyer, seller, truck line carrier, ship line, operations and security entities, finance entities and the like. The system and method can communicate and transmit to permitted parties, the serial number of containers staged and ready to be retrieved at ground level, the time, duration of operation and date, for example.

5. The support structure and method has the capability of loading, unloading, storing, handling and staging containers for immediate selectivity under its own power. It is particularly adapted for use by a truck line carrier to automatically pick up or deliver a container where needed, such as at ports, terminals, hubs, distribution center and the like.

6. The support structure and method can be seen as a robotic device for automated loading, unloading, storing and/or staging of containers. Thus, cranes are not required to accommodate the truck line carriers to coordinate a handoff in real time. The support structure and method can be equipped with software to communicate with site and/or remote operations, drivers, and stakeholders with permissions, for monitoring the handling of a particular container.

7. The support structure and method can include real time monitoring and communication automatically and can include automated billing and invoicing when the container with cargo is received or retrieved, for example.

8. The support structure and method can help to enhance productivity of drivers and crane operators, as they are not required to synchronize their movements in real time.

9. The support structure and method can be utilized as an accessory for a master design for multiple applications, to accommodate multiple support structures spaced side by side, support structures with multi-levels, top loading, flipping, etc. for enhanced efficiencies in the logistics arena.

10. The support structure and method can include software and wired and wireless technology, to monitor activities and notify interested entities with permissions.

11. The support structure and method can enhance loading and unloading of various sized containers from a truck line chassis and/or from a crane, at a hub, port, terminal or distribution area, for example.

12. The support structure and method can provide immediate selectivity and staging, for enhanced blocking.

13. The support structure and method can provide enhanced foot print efficiency, in embodiments with multiple units located side by side and with multi-story embodiments.

14. The support structure and method can provide a seamless transfer and staging solution.

15. The support structure and method are adapted to facilitate the handling and installing of IBC corner casting and twist locks.

16. The support structure and method can provide enhanced crane related efficiencies, in embodiments with top loading, side by side units and/or multi-story embodiments, thus enabling double cycling, which allow a crane operator to load on one structure and retrieve from another in a single half cycle.

17. The support structure and method can provide continuous communication of the progress of a container shipment, to entities having permission to monitor such activities.

18. The support structure and method can provide staging and storing for in and outbound containers automatically.

19. The support structure and method can require substantially less acreage than conventional transfer systems.

20. The support structure and method can help to reduce operational costs and handling of containers.

21. The support structure and method can be operated in a seamless manner, with minimal touches and lifts.

22. The support structure and method has many applications, such as they can be installed in proximity to shipping and receiving bays, hubs, ports, terminals or other places of business. A truck line carrier can deliver or retrieve a container automatically. This can reduce the costs to a truck line carrier associated with waiting. Also, off hour deliveries and retrievals can enhance efficiencies.

As should be understood by those skilled in the art, various modifications and alterations can be made without departing from the spirit and scope of this invention.

What is claimed is:

1. A method of handling a container comprising the steps of:
   determining a length dimension of a first container in a bay defined by a support structure;
   actuating certain support shoes to move from a stowed position to an extended position, based on the determined length dimension;
   verifying that the certain support shoes are in an extended position along an X-axis;
   activating a support structure to move to an elevated position; and
   indicating that a handoff of the first container to the support structure has been completed.

2. The method of handling a container in claim 1, further comprising determining that the first container is located at a predetermined parked position, along a Y-axis.

3. The method of handling a container in claim 1, wherein the activating step includes moving the support structure from a default elevation to an elevated position defining a stored container position.

4. The method of handling a container in claim 1, wherein the indicating step includes prompting a hauler that it is appropriate to exit the support structure and leave the first container in the elevated position.

5. The method of handling a container in claim 1, wherein the support structure is configured to receive or deliver a container from a top and is dimensioned to include at least a first ground cell and a second cell above the first.

6. The method of handling a container in claim 1, wherein the detecting step includes providing a sensor configured to sense at least one of length, position and alignment of the container.

7. A method of handling a container comprising the steps of:
   storing a length dimension of a stored container in a stored position of a support structure, in memory;
   verifying chassis compatibility with the stored container;
   activating a support structure to move to a lowered position from the stored position, wherein verifying chassis compatibility with the stored container includes verifying that certain support shoes of the support structure are in an extended position along an X-axis before activating the support structure to move to a lowered position from the stored position;
   actuating the certain support shoes to move from an extended position to a stowed position, based on the stored length dimension; and
   indicating that a handoff of the stored container to a chassis has been completed.

8. The method of handling a container in claim 7, further comprising indicating a predetermined parked position for an empty chassis, based on the stored length dimension, before the activating step.

9. The method of handling a container in claim 7, further comprising verifying that an empty chassis is positioned at a predetermined parked position, before the activating step.

10. The method of handling a container in claim 7, wherein the activating step includes lowering the support structure from the stored position to the lowered position including a full down position configured for placing the stored container on a chassis.

11. The method of handling a container in claim 7, further comprising indicating that it is permissible to enter a bay defined by the support structure along a Y-axis, wherein the activating step includes lowering the support structure from the stored position to the lowered position including a full down position configured for placing the stored container on a chassis, verifying that the support structure is at the full down position, and retracting the certain support shoes to the stowed position.

12. The method of handling a container in claim 7, wherein the activating step includes lowering the support structure to a full down position configured for placing the stored container on a chassis, verifying that the support structure is at the full down position, retracting the certain support shoes to the stowed position, and verifying that the certain support shoes are in the stowed position.

13. The method of handling a container in claim 7, wherein the indicating step includes prompting a hauler that it is appropriate to exit the support structure with the container that was stored.

14. The method of handling a container in claim 7, further comprising locating a plurality of bays each with a support structure, substantially immediately adjacent to each other and arranged in a substantially parallel arrangement with each other.

15. A system for handling a container, including:
- a support structure defining a bay, the support structure including support shoes configured to support a container;
- a sensor for determining a length of a container in the bay; and
- a controller configured to operate the support structure including a storage mode and a retrieval mode,
  the controller in the storage mode is configured to actuate certain support shoes to move from a stowed position to an extended position, based on the sensed length of the container; verify that the certain support shoes are in an extended position along an X-axis; activate the support structure to move to an elevated position; and indicate that a handoff of the container to the support structure has been completed, and
  the controller in the retrieval mode is configured to store a length dimension of a stored container in a stored position; verify chassis length compatibility with the stored container which includes verifying that certain support shoes are in an extended position along an X-axis; activate the support structure to move to a lowered position from the stored position; actuate the certain support shoes to move from an extended position to a stowed position, based on the stored length dimension; and indicate that a handoff of the stored container to a chassis has been completed.

16. The system for handling a container in claim 15, wherein the support structure is dimensioned to include at least a first ground cell and a second cell above the first.

17. The system for handling a container in claim 15, wherein the sensor is configured to sense at least one of height, length, location and alignment of the container.

18. The system for handling a container in claim 15 being located in proximity to a container handling facility.

19. The system for handling a container in claim 15, wherein the support structure is configured to receive or deliver a container from a top.

* * * * *